(12) United States Patent
Frohock et al.

(10) Patent No.: US 10,002,149 B2
(45) Date of Patent: Jun. 19, 2018

(54) RELEVANCE RANKING FOR DATA AND TRANSFORMATIONS

(71) Applicant: SourceThought, Inc., San Juan Capistrano, CA (US)

(72) Inventors: Ron Frohock, Trabuco Canyon, CA (US); Chhay Taing, Irvine, CA (US); Chris Andrade, Rancho Santa Margarita, CA (US); Karl Gierach, Irvine, CA (US); Michael Ransom Pennell, San Clemente, CA (US)

(73) Assignee: SOURCETHOUGHT, INC., San Juan Capistrano, CA (US)

( * ) Notice: Subject to any disclaimer, the term of this patent is extended or adjusted under 35 U.S.C. 154(b) by 533 days.

(21) Appl. No.: 14/628,862

(22) Filed: Feb. 23, 2015

(65) Prior Publication Data

US 2015/0242408 A1   Aug. 27, 2015

Related U.S. Application Data

(60) Provisional application No. 61/943,323, filed on Feb. 22, 2014.

(51) Int. Cl.
*G06F 17/30* (2006.01)
(52) U.S. Cl.
CPC .............................. *G06F 17/30345* (2013.01)
(58) Field of Classification Search
None
See application file for complete search history.

(56) References Cited

U.S. PATENT DOCUMENTS

| | | | | |
|---|---|---|---|---|
| 6,990,238 B1* | 1/2006 | Saffer | ............... | G06F 17/30716 382/224 |
| 7,849,049 B2* | 12/2010 | Langseth | .......... | G06F 17/30563 707/602 |
| 8,055,672 B2* | 11/2011 | Djugash | ............ | G06F 17/30392 707/717 |
| 8,495,077 B2* | 7/2013 | Bayliss | ............. | G06F 17/30303 707/609 |
| 8,521,729 B2 | 8/2013 | Churi et al. | | |
| 8,775,473 B2 | 7/2014 | Anzalone et al. | | |
| 8,996,559 B2* | 3/2015 | Ganti | ................ | G06F 17/30554 707/766 |
| 9,092,502 B1* | 7/2015 | Cannaliato | ........ | G06F 17/30595 |
| 9,201,981 B2* | 12/2015 | Anzalone | .......... | G06F 17/30592 |
| 2011/0320472 A1* | 12/2011 | Griffith | ............. | G06F 17/30696 707/767 |
| 2013/0086067 A1* | 4/2013 | Khoussainova | .. | G06F 17/30646 707/737 |

(Continued)

*Primary Examiner* — Jeff A Burke
(74) *Attorney, Agent, or Firm* — Fish IP Law, LLP (57) ABSTRACT

A system for generating a new dataset gleans a corpus of datasets to find attributes that could be used to construct a new dataset. When an entity selects attributes, the system analyzes relationships between the selected attributes and unselected attributes in order to generate a ranked list of suggested attributes, with the most relevant attributes at the top of the list. The system could also use this system to suggest transformations to the attributes for use in the new dataset. The entity could then select additional attributes and/or transformations to apply to the new dataset before the new dataset is generated.

20 Claims, 3 Drawing Sheets

(56) References Cited

U.S. PATENT DOCUMENTS

| | | | |
|---|---|---|---|
| 2013/0091164 A1* | 4/2013 | Finnigan | G06F 17/30867 707/769 |
| 2013/0151572 A1* | 6/2013 | Brocato | G06F 17/30297 707/805 |
| 2013/0254155 A1* | 9/2013 | Thollot | G06F 17/30528 707/602 |
| 2013/0282497 A1 | 10/2013 | Forman et al. | |
| 2014/0279243 A1 | 9/2014 | Kukal et al. | |
| 2014/0280286 A1* | 9/2014 | Ganti | G06F 17/30554 707/766 |
| 2014/0282227 A1* | 9/2014 | Nixon | G06F 17/5009 715/786 |
| 2014/0337331 A1* | 11/2014 | Hassanzadeh | G06F 17/30578 707/726 |
| 2014/0372346 A1* | 12/2014 | Phillipps | G06N 99/005 706/12 |
| 2015/0026153 A1 | 1/2015 | Gupta et al. | |
| 2015/0100542 A1* | 4/2015 | Li | G06F 17/30563 707/602 |
| 2015/0278214 A1* | 10/2015 | Anand | G06F 17/30696 707/748 |
| 2016/0055184 A1* | 2/2016 | Fokoue-Nkoutche | G06F 17/30339 707/809 |
| 2016/0188843 A1* | 6/2016 | Staples, II | G06F 19/363 705/3 |
| 2016/0328406 A1* | 11/2016 | Convertino | G06F 3/04842 |

* cited by examiner

RELEVANCE RANKING FOR DATA AND TRANSFORMATIONS

This application claims the benefit of priority to U.S. provisional application 61/943,323 filed on Feb. 22, 2014. This and all other extrinsic references referenced herein are incorporated by reference in their entirety.

FIELD OF THE INVENTION

The field of the invention is data integration techniques.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Many computer systems collect, aggregate, and process data in order to perform tasks and run analytics. There has been, and will likely continue to be, a significant increase in the volume and variety of data available to organizations from various disparate sources. The term "Big Data" is often used to describe this trend. Organizations oftentimes seek ways to use such data in order to gain insight, improve performance, and develop predictive models. Efficiently using data from disparate sources oftentimes requires combining and transforming the data into a single dataset before processing the data. However, it may be difficult to determine the most relevant data sources and attributes and how these need to be transformed to be most useful. Therefore it would be beneficial for a system to recommend to the user relevant data attributes and transformations.

U.S. Pat. No. 8,775,473 to Anzalone teaches a data processing system that aggregates data from two different data repositories to create a multidimensional data structure. Anzalone's system will allow a client user to select attributes to be analyzed and modeled. An analytic recommendation processor will then suggest additional available attributes based upon past response rates of other users who also selected such attributes. Anzalone's system, however, is unable to predict new attributes to suggest when past users have not selected the new attributes nor can it rank the suggested attributes and associated transformations based on the similarity of the current selection to prior selections.

US 2015/0026153 to Gupta teaches a search engine that generates relational database queries among a plurality of databases. When a user enters a search term, such as "revenue," a state machine will look for related attributes and measures to suggest, such as "state," "city," or "tax." Gupta, however, requires an administrator of the system, however, to pre-program the state machine with relational data that suggests related attributes and measures to the user's search term. Gupta is unable to predict new related attributes to suggest when past users have not selected the new attributes nor can Gupta's system rank the suggested attributes and associated transformations based on the similarity of the current selection to prior selections.

Thus, there remains a need for an improved system and method that suggests and ranks unselected relevant attributes and associated transformations.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. A "functional coupling" between two or more electronic devices is intended to include both wired and wireless connections between the electronic devices such that a signal can be sent from one electronic device to another electronic device.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The inventive subject matter provides apparatus, systems, and methods in which a computer system receives a selection of attributes for a new dataset, and then suggests additional attributes and transformations that could be of interest to the entity making the selection.

It should be noted that any language directed to a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash. ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Data received by the computer system is typically stored and processed in a non-transitory computer readable storage medium.

The computer system generally has a data collection module configured to receive one or more datasets from various, frequently disparate, data sources through a wired or wireless interface (e.g. a serial port, an Internet connection) and store those datasets on a computer readable memory. As used herein, a "data source" is a computer device that transmits one or more datasets to one or more computer systems. Preferably, such data sources save the dataset on a non-transitory computer-readable medium, such as a file repository, a relational database management system, or a cloud service. Such data sources could be structured (e.g. DBMS) or poly-structured (e.g. XML, JSON, log files, sensor outputs). A single data source could house one or more datasets and a single computer system could access one or more data sources. While some data sources may have metadata on datasets, such as an indicator that an attribute of a database table is a key attribute, other data sources could simply be comma-separated value (csv) files containing only table headings and values. As used herein, an "attribute" of a dataset is a characterization of a discrete subset of values within the dataset. In a standard database table, a column could be considered an attribute and each column/row intersection in that column could be considered a value of that attribute.

The computer system also generally has a interface module that could be functionally coupled to a distal computing device, such as a user interface or a calling computer system. The interface module is configured to glean attribute information from at least some of the available datasets and present some, or all, of the attributes from the datasets to the distal computing device. A user entity could review the list of attributes and could select some of the attributes for inclusion into a new dataset. The attributes that are available to be included into the new dataset are typically called "available attributes" while the attributes that were selected by the user through the user interface are typically called "selected attributes." The selected attributes typically represent attributes that the user wants to have in the new dataset being constructed by the computer system. The interface module could then receive one or more sets of selected attributes from the user interface, which could then be used to determine other attributes that might be of interest to the user who selected the previous attributes-called the "suggested attributes." As used herein, a "user entity" could be any entity accessing the computer system to select attributes from a plurality of datasets, for example a human user accessing the computer system through a user interface or a calling system accessing the computer system through a network interface.

A relevance ranking module generally generates the list of suggested attributes as a function of the selected attributes. Since the suggested attributes are usually included in the list of available attributes that have not been selected by the distal computing device, the ranked list of suggested attributes could simply be a re-ranked list of unselected attributes. The ranking of suggested attributes could be based, at least in part, on one or more relationships between the suggested attributes and the selected attributes, the confidence in those relationships, and the frequency of prior combinations of attributes that included suggested and selected attributes.

In a preferred embodiment, the relationship between a suggested attribute and one or more selected attributes has a quantifiable relevance metric associated with the relationship. Having a quantifiable relevance metric allows the relevance ranking engine to adjust the ranking of suggested attributes according to a numerical algorithm. In embodiments where the relationship matrix is represented as a nodal map between attributes, the relevance metric could be derived as a function of a numerical distance between a suggested attribute and one or more selected attributes. The relationships themselves could also be weighted. For example, attributes related because they are included in the same transformation might be given a higher weight than attributes related because they are included in the same dataset.

A traveling salesman-type algorithm could be applied for each suggested attribute in a nodal map, for example, giving a higher weight to suggested attributes that have a smaller numerical distance to selected attributes, giving a higher weight to suggested attributes that are closely connected to a plurality of selected attributes, giving a higher weight to suggested attributes that are part of the same dataset as a selected attribute, and/or giving a higher weight to suggested attributes that is associated with a suggested transformation. As used herein, a "transformation" for an attribute is a function that is applied to an attribute to alter its data, such as a transformation function that transforms attribute values from one form to another (e.g. a transformation from a string to an integer or from a date to a timestamp), or a normalization that alters metadata of related attributes to the same or similar metadata (e.g. normalizing the attribute "Name" and "First Name, Last Name" to be "Full Name") Typically, transformations are used to conform one or more attributes in one dataset to match one or more attributes in another dataset or satisfy the requirements for a newly synthesized dataset. These transformations could be formed by an ordered set of simple character manipulation or mathematical conversions of one or more data attributes.

Suggested transformations could also be ranked based upon a determined relevance metric between the suggested transformations and the selected attributes or selected transformations and suggested attributes. Preferably, the only suggested transformations are those that are associated either with selected attributes or suggested attributes, and the relevance ranking module filters out all other suggested transformations.

The list of ranked suggested attributes and/or list of ranked suggested transformations are preferably provided to a distal computing device via a presentation module, which presents one or more ranked lists to a user entity. As a user entity selects a suggested attribute, the attribute is preferably then categorized as a selected attribute, which could trigger a re-ranking of the suggested attributes (minus the newly selected attribute) and/or a re-ranking of the suggested transformations. Likewise, as a user entity selects a suggested transformation, the transformation is preferably then categorized as a selected transformation, which could trigger a re-ranking of the suggested attributes and/or a re-ranking of the suggested transformations (minus the newly selected transformation).

After a user entity selects attributes from the list of suggested attributes or the list of available attributes (and sometimes a list of suggested transformations), the user entity could then send a request to generate the new dataset containing all of the selected attributes (and possibly transformations of attributes). A dataset generation module would then generate the new dataset that includes all the selected attributes. The suggested attributes and transformation, in conjunction with the corresponding rankings, can also be used to validate selections made by a calling system or human user. If certain selections are not included in the suggestions, the user entity could be warned or even stopped thereby enabling them an opportunity to ensure that the selections are correct even though they are not consistent with prior usage.

Various objects, features, aspects and advantages of the inventive subject matter will become more apparent from the following detailed description of preferred embodiments, along with the accompanying drawing figures in which like numerals represent like components.

One should appreciate that the disclosed techniques provide many advantageous technical effects including easily providing relevant, related, and ranked suggested attributes and transformations to a user entity when only a little knowledge is presented.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

DETAILED DESCRIPTION

The inventive subject matter provides apparatus, systems, and methods in which a computer system receives a selection of attributes for a new dataset, and then suggests additional attributes and transformations that could be of interest to the entity making the selection.

The computer system provides a unique and novel approach in assisting and directing selection and traversal of related data attributes and/or transformations upon data attributes. The inventive subject matter could utilize information regarding relationships, prior utilization of relationships, interaction of attributes in groups, and relationship confidences between attributes to construct Traversal Relevance Ranking (TRR) scores for data attributes and/or transformations. A "TRR" is a list that is ranked by priority of how highly the item is recommended that could be used for both human and programmatic interaction with data attribute relationships and transformations.

Figure 1:
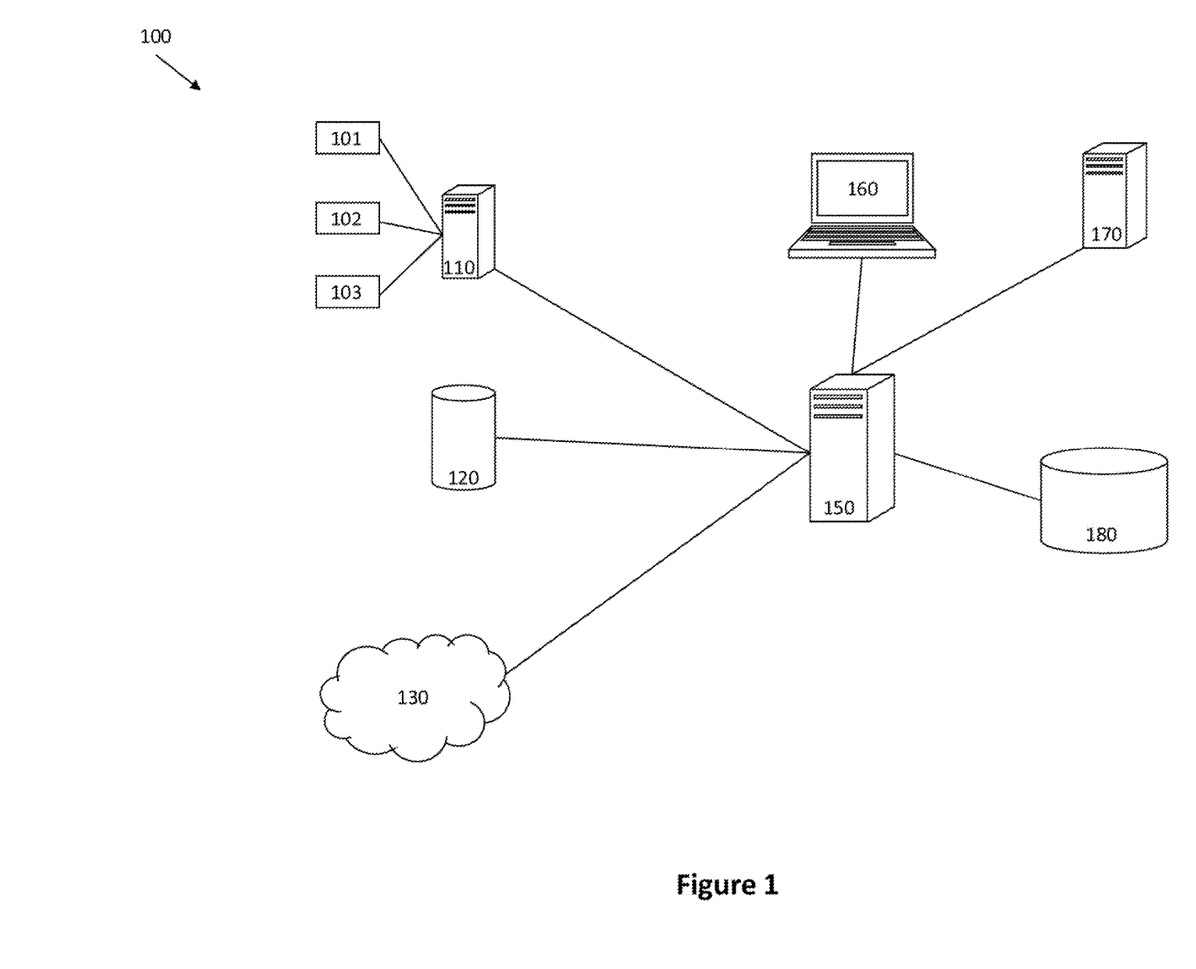
FIG. 1 is a hardware layout of an exemplary inventive system.

In FIG. 1, a system has data sources 110, 120, and 130 are functionally connected to computer system 150, which is functionally connected to user interface 160, calling system 170, and data repository 180. Data source 110 is as a computer system 110 that collects data from sensors 101, 102, and 103 and stores data collected from each sensor into datasets saved in a memory. Such data sources typically store collected information in a text file, such as a log, csv, JSON or an XML file. Data source 120 is a DBMS, such as SQL® or Oracle®, that keeps data in a structured environment, and typically keeps metadata log files on its datasets. Data source 130 is a cloud storage repository holding many different types of structured and poly-structured datasets. While data sources 110, 120, and 130 are represented as a poly-structured data source, a structured data source, and a multi-structured data source, any number of data sources and any type of data source could be used without departing from the scope of the invention. The data sources coupled to computer 150 could number in the hundreds or even thousands, to provide a large corpus of datasets that may or may not be known to computer system 150, where many of the data sources might use different types of data structures.

Computer system 150 is functionally coupled to data sources 110, 120, and 130 in a manner such that computer system 150 could receive or retrieve datasets from data sources 110, 120, and 130. While computer system 150 could be physically coupled to each data source 110, 120, and 130, computer system 150 is preferably functionally coupled to each data source through a network link, such as an intranet or the Internet. Computer system 150 is configured to retrieve datasets from the various data source 110, 120, and 130, and consolidate the datasets into one or more new datasets, which are saved in data repository 180—a non-transitory computer readable medium functionally coupled to computer system 150. Data repository 180 could also be considered a data source having one or more datasets that computer system 150 could glean datasets from. Data repository 180 also preferably contains a historical log of the retrieving, profiling, querying and conforming of the data and the associated user interaction to enable the system to "learn" from historical usage.

Requests could be sent to computer system 150 from any authorized system, such as user interface 160 or calling system 170. User interface 160 is shown as a display screen and a keyboard, but could comprise any known user interface without departing from the scope of the invention, such as touch screens or terminal devices. In a typical embodiment, a user entity might access computer system 150 through user interface 160 to request that two or more datasets be analyzed, or that a plurality of attributes from a plurality of datasets be chosen for a new generated dataset. Alternatively, a user entity could define criteria such as data source location and type such that computer system 150 will analyze the data source automatically based on a periodic schedule or an event such as a file transfer to retrieve updated datasets. In other embodiments the user interface might request to analyze all datasets for all known attributes, and computer system 150 would send a list of all known attributes to user interface 160.

Through user interface 160, a user entity could select a data source and an attribute from that source, and then the user entity could search and select a second attribute from the list of available attributes or suggested attributes from related. Computer system 150 compiles the list of available attributes, which are attributes of any other data set that has an attribute with a direct or indirect relationship with an attribute belonging to the chosen dataset. Computer system 150 could then derive the TRR scores for unselected available attributes and transformations related to the selected attributes. The TRR scores, based upon the user's selections, could be used to rank suggested attributes and/or suggested transformations, which are then presented to user interface 160. Computer system 150 presents the available attributes, suggested attributes and suggested transformations to the user interface 160, preferably displaying the highest ranked suggested attributes and transformations first. The user entity could select additional attributes and transformations in a similar manner which could then alter the TRR scores, suggested attributes and suggested transformations. Once a user entity has chosen a set of attributes and transformations to be applied to attributes of the new dataset, computer system 150 could join appropriate datasets in order to provide a dataset containing all of the selected attributes (possibly with selected transformations applied to some of the attributes). The dataset may have already been retrieved, or if not, any selected datasets and associated attributes would then be retrieved from data sources 110, 120, and 130.

In other embodiments, a calling system 170 could send a request to computer system 150 for a new dataset with selected attributes, for example through an API. Computer system 150 could then respond with available attributes, suggested attributes and/or suggested transformations to calling system 170 based upon TRR scores derived from the selected attributes. Calling system 170 could perform an automated analysis of the suggestions (e.g. picking the top 5 suggestions from each list, or picking the suggestions with a TRR score above a certain threshold), or calling system 170 could pass those suggestions on to another system (not shown), for example another user interface. In either embodiment, calling system 170 could then pick from the available attributes, suggested attributes and/or suggested transformations, and computer system 150 could then generate a new dataset containing all of the selected attributes (possibly with selected transformations applied to the attributes).

Figure 2:
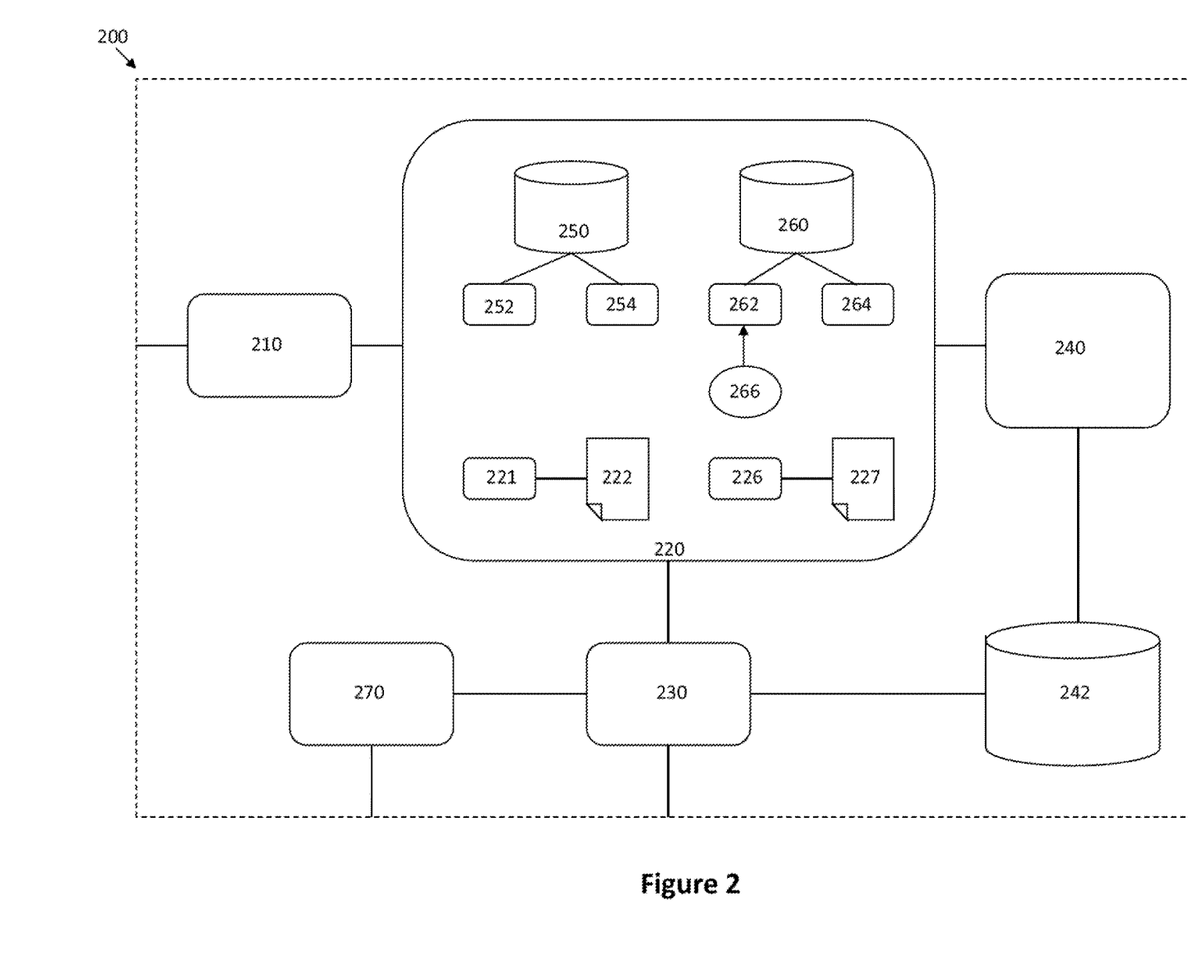
FIG. 2 is a software layout of the computer system in FIG. 1.

In FIG. 2, an exemplary software schematic 200 of computer system 150 is shown, having a data collection module 210, relevance ranking module 220, interface module 230, API module 270, and dataset generation module 240. Data collection module 210 is a software module that is configured to collect any number of datasets from any number of data sources coupled to computer system 150. Data collection module 210 could be configured to process requests that are submitted by a user entity through interface module 230, for example from a user interface (not shown) or from a calling computer system (not shown) through API module 270. In some embodiments, the user entity might not submit a direct request for specific datasets, but might instead submit a request for specific attributes. Where a user requests attributes, data collection module 210 could be configured to verify whether relevant datasets have already been retrieved or retrieve the relevant datasets that might contain the queried attributes. In other embodiments, data collection module 210 is configured to retrieve all datasets, or metadata from all datasets, in order to perform a relationship analysis. Here, data collection module 210 has retrieved dataset 250 having attributes 252 and 254 and dataset 260 having attributes 262 and 264, and has passed them to relevance ranking module 220 for analysis. Ranking module 220 has analyzed each attribute, and has determined that transformation 266 could be applied to attribute 262. Each attribute is represented as a rounded rectangular node in the schematic, with a line representing the containment or ownership of the data attribute to the dataset. Each transformation is represented by an oval in the schematic, with an arrow representing the transformation that could be applied to an attribute.

Relevance ranking module 220 analyzes the corpus of received datasets, in this case just dataset 250 and dataset 260, to derive a list of attributes that could be included in a new dataset. This list of attributes is sent to interface module 230 to be presented to a remote system, such as a user interface (not shown) or a calling system (not shown). Interface module 230 then receives a selection of a set of attributes to be included in a new dataset to be generated.

Relevance ranking module 220 has an attribute TRR generator 221 and a transformation TRR generator 226. Attribute TRR generator 221 analyzes the attributes that were selected, and generates a list of TRR attribute scores 222. Likewise, transformation TRR generator 226 analyzes the selected attributes, and generates a list of TRR transformation scores 227. The list of TRR attribute scores 222 and the list of TRR transformation scores 227 are then used by interface module 230 to generate a ranked list of suggested attributes and a ranked list of suggested transformations, which are presented to a remote system, such as a user interface or a calling system. Suggested attributes (available attributes that have not been selected) are ranked as a function of the TRR attribute scores. Generally the higher the TRR attribute score, the higher the ranking of the suggested attribute. Likewise, suggested transformations are ranked as a function of the TRR transformation scores. Generally, the higher the TRR transformation score, the higher the ranking of the suggested transformation. When a user entity selects a suggested attribute and/or a suggested transformation, attribute TRR generator 221 could analyze the selections to update the list of TRR attribute scores, and transformation TRR generator 222 could analyze the selections to update the list of TRR transformation scores.

Machine learning and statistical analysis could be utilized to improve the TRR based on interactions with a user entity. As user entities select certain suggestions (positive responses) and do not select other suggestions (negative responses), these interactions provide a set of positive and negative responses along with the corresponding characteristics and relationships of the suggested attributes and transformations. A record of every user entity's preferences is preferably stored in a historical log of events. The relevance ranking module 220 could then alter the weighting and decision trees used in any algorithm that calculates the TRR to improve the suggestions. Based on these historical user selections, the TRR algorithms could be adjusted to increase the TRR score of attributes and transformation with the characteristics similar to those that were suggested and accepted when the user entity had previously selected similar and attributes. Conversely, the TRR algorithms could adjust to decrease the TRR of attributes and transformation with characteristics similar to those that were suggested but rejected when the user entity had previously selected similar and attributes. Such adjustments could be applied only to a specific user entity, only to a specific group of user entities, or globally to all user entities accessing the system.

As the remote system continues to make selections, the attribute TRR generator 221 and the transformation TRR generator 226 continue to update and re-generate TRR attribute scores and TRR transformation scores. When the remote system selects one or more of the suggested transformations, attribute TRR generator 221 and transformation TRR generator 226 could generate TRR scores as a function of the newly selected transformations as well as the newly selected attributes. In some embodiments, interface module 230 could receive a command to regenerate the list of suggested attributes and list of suggested transformations. In other embodiments, interface module 230 could automatically update the list of suggested attributes and the list of suggested transformations as selections are made. The new dataset could be generated when a predetermined trigger from interface module 230 has been met. Exemplary triggers could be, for example, when the remote system has made a selection of attributes for a second time, or when the remote system has sent a command indicating that the new dataset should be generated.

Dataset generation module 240 then creates a new dataset as a function of the selected attributes and, in some embodiments, as a function of the selected transformations. The new dataset is then generally saved to data repository 242. Data repository 242 is a computer readable medium that could utilize the new dataset in a variety of ways. In some embodiments, interface module 230 will retrieve the new dataset for display to a user interface, or for export to a calling system. In some embodiments the dataset could be transmitted to a remote data repository, such as a data warehouse or even an unstructured data repository. In still other embodiments data repository 242 could store the new dataset in memory until a command is received to access the new dataset (e.g. export the dataset, view the dataset, or delete the dataset). Data repository 242 preferably also holds historical transaction data used to update and modify weights and/or decision trees used to derive a TRR score.

Figure 3:
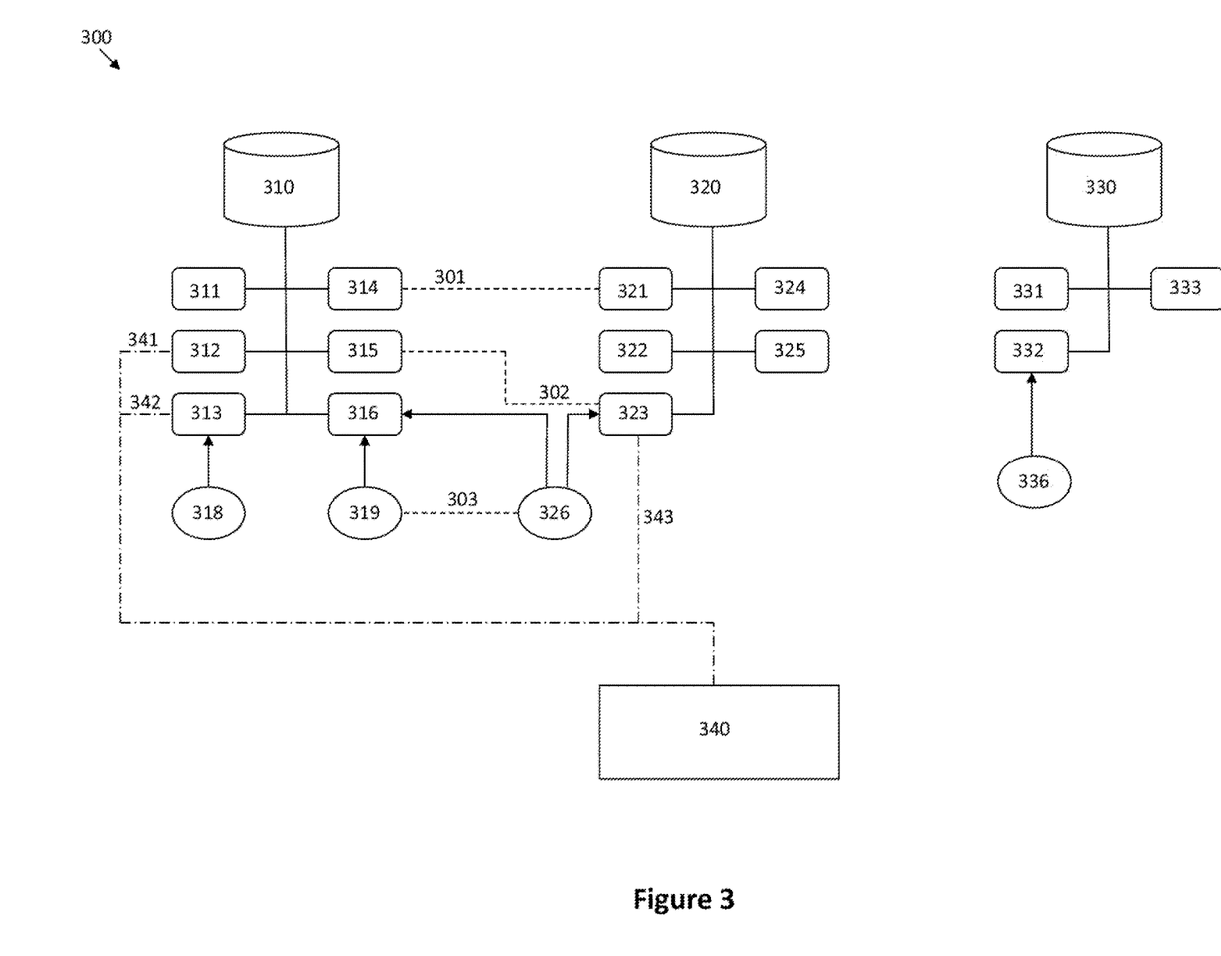
FIG. 3 shows an exemplary universe graph of selected attributes.

The manner by which attribute TRR generator 221 and transformation TRR generator 226 generate TRR scores is better illustrated in FIG. 3. In FIG. 3, an exemplary universe graph 300 shows datasets 310, 320, and 330. Each dataset has a plurality of attributes. Relationships between data attributes and datasets are shown by solid link lines. Dataset 310 has attributes 311, 312, 313, 314, 315, and 316. Dataset 320 has attributes 321, 322, 323, 324, and 325. Dataset 330 has attributes 331, 332, and 333.

As used herein, a "universe graph" is a graph that depicts the entire corpus of all datasets, attributes, and transformations that the data collection module has retrieved from various data sources, represented here by universe graph 300. The subset of the universe graph in the scope of the contemplated new dataset is called a working graph, represented by working graph 340. Working graph 340 is determined or set by a user entity via a interface module or by a calling system via an API, and represents a set of selected attributes, and sometimes selected transformations, of interest. Here, working graph 340 has made a selection 341 of attribute 312, a selection 342 of attribute 313, and a selection 343 of attribute 323.

Some of the attributes have one or more transformations associated with the data attributes. Transformations are depicted on the universe graph as an oval node connected to an associated attribute with an arrow line. Such transformations could be, for example, expressions that define how a data attribute might be transformed from one form to another form. Transformations could also be filters, aggregations, or transpositions that combine or select information from different rows to include in the new data set. For example, a date attribute filter could limit the rows to a particular date range or an aggregation could sum amounts from multiple rows onto a single row in the new dataset. Preferably, when such transformations are applied to an attribute, the attribute in the dataset does not actually change, but rather a new attribute is created, which is then incorporated into the new dataset instead of the original attribute. Transformations could be applied to a single original attribute to generate a single new attribute (e.g. a transformation that changes original string values to new integer values), transformations could be applied to a single original attribute to generate a plurality of new attributes (e.g. a transformation that parses a composite text attribute like full name to separate first and last name attributes), or transformations could be applied to a plurality of original values to generate a single new attribute (e.g. a transformation that changes an original length attribute, an original width attribute, and an original height attribute into a new volume attribute). Both attributes and transformations are referred to as nodes of universe graph 300.

Relationships between attributes and relationships between transformations are defined by regular dotted lines. Such relationships could be, for example, Relationship Confidence Metrics (RCM), Utilization Metrics (UM), and Navigation Tracking (NT). RCMs are defined in copending application Ser. No. 14/628,810 titled, "DISCOVERY OF DATA RELATIONSHIPS BETWEEN DISPARATE DATASETS," which is incorporated herein by reference. UMs are metrics that track how various attributes have been historically used and combined by a group of entities. For example, if more than 100 previous user entities in a first group of user entities have generated new datasets containing attribute 314 and attribute 321, then the UM relationship between those two attributes might be increased for a user entity of that first group, but decreased for a user entity of a different group. Similarly, if only 10 previous user entities in the first group of user entities have generated new datasets containing attribute 314 and attribute 322, then the UM relationship between those two attributes would be lower than the UM relationship between 314 and 321 for the first group. The UM relationship could vary based on the users that combine these attributes, the number of times the combined dataset was generated or requested, the type of request (e.g. is the dataset being used in discovery, testing or production) and could incorporate other utilization metrics.

NTs are metrics that measure the frequency a relationship has been used to navigate and join different datasets and attributes on those. For example, assume relationship 301 was used 100 times to join datasets 310 and 320 when attributes 311 and 321 were combined on a new dataset, and assume relationship 302 was used only 10 times when attributes 311 and 323 were combined on a dataset. If the user selects attribute 311, then attribute 321 would have a higher NT metric when relationship 301 is used to join the datasets, and attribute 323 would have a higher NT metric when relationship 302 is used to join the datasets. Universe graph 300 shows relationship 301 between attributes 314 and 321, relationship 302 between attributes 315 and 323, and relationship 303 between transformation 319 and 326.

The attribute TRR generator and transformation TRR generator (referred to as TRR generators) then construct TRR scores for each unselected attribute and unselected transformation, which would be used to recommend unselected attributes and unselected transformations from universe graph 300. As the selections of working graph 340 change, the TRR scores will also change. Also, if new datasets are incorporated into the working graph, the TRR scores might also change.

The TRR generators could weight certain relationships higher than other relationships depending upon a user entity of the system. For example, a user entity might have historically picked certain attributes to be included with one another in new datasets, thus that user's UM relationships might be weighted heavier than other user's UM relationships. Other members in a group of user entities (e.g. other employees at the same company) might have historically picked certain attributes to be included with one another in new datasets, thus those member's UM relationships might be weighted heavier than UM relationships outside of that group, but lower than UM relationships associated with the user entity itself.

In order to construct a ranked list, the system first analyzes all of the nodes in universe graph 300 that have a relationship with selected nodes of working graph 340 to select a number of suggestion candidates. A relationship can be defined by one or more of the solid lines, dotted lines, and arrows that connect a path between a selected node and an unselected node. A path can be direct requiring a single connecting relationship to link the nodes (e.g. attribute 314 is connected to attribute 321 using relationship 301), or a path can be indirect requiring more than one connecting relationship to link the nodes (e.g. attribute 311 is connected to attribute 324 using a path 311 to 314 to 321 to 324). Nodes that do not have any sort of relationship between the node and a selected attribute are not considered candidates. Here, nodes 331, 332, 333, and 336 are not considered candidates because there is no path from any of those nodes to any of the selected nodes 312, 313, or 323. Nodes 312, 313, and 323 also are not considered candidate nodes because they have already been selected by working graph 340. Nodes 311, 314, 315, 316, 318, 319, 321, 322, 324, 325, and 326 are all considered candidate nodes that could be suggested.

The system then evaluates each of the unselected candidate nodes to determine that node's TRR score. Attribute TRR generators are generally used to evaluate attributes, while transformation TRR generators are generally used to evaluate transformations. In some embodiments, there is no difference between attribute TRR generators and transformation TRR generators. In other embodiments, transformation TRR generators are subdivided into sub-function TRR generators. For example a system could have data transform TRR generators and metadata transform TRR generators. For each node in the candidate list of nodes, a TRR generator could create a feature vector including all attributes of each candidate node and each related selected node in the working graph, including the connecting relationship attributes. The TRR then could compute the TRR based on a function of the feature vector, which could include any or all of the following metrics: an RCM, global usage of the attribute relationship (UM), a user group's usage of the attribute relationship (UM), a user entity's usage of the attribute relationship (UM), the dataset relationship(s) used to join the datasets when combining the attributes, the usage of the dataset relationship(s) by the user, user group and globally (NT), and a distance to the node. Additional metrics could be added to the feature vector without departing from the scope of the invention.

Preferably, the TRR algorithm weights each feature in the feature vector based on machine learning and statistical analysis models that optimize the suggestions based on prior user selections. For simplicity, the following example assumes a single prior usage of each attribute and transformation using relationship 301 to join all attributes of dataset 310 and 320. Each path (a solid line, a dotted line, or an arrow) is generally given a weight, and certain paths are given higher weights than others depending upon the importance of the relationship. In this example, each path is given a weight of 1 for a simplistic calculation, so the only varying feature in each feature vector is the distance to the node and the only calculation performed is a calculation of a distance between nodes. In this example, for each node, a system will calculate its TRR score as a function of the shortest path from that node to various selected nodes.

When drawing a path between unselected node 311 and selected node 312, a simple path of 1 is found since both attributes are a part of dataset 310. When drawing a path between unselected node 311 and selected node 313, a simple path of 1 is found since both attributes are a part of dataset 310. When drawing a path between unselected node 311 and selected node 323, a simple path of 2 is found running through node 315. The third path between unselected node 311 and selected node 323 is given a weight of ½, since a longer path is worth less than a smaller path. Thus, the TRR score for node 311 is 2½.

When drawing a path between unselected node 314 and selected node 312, a simple path of 1 is found since both attributes are a part of dataset 310. When drawing a path between unselected node 314 and selected node 313, a simple path of 1 is found since both attributes are a part of dataset 310. When drawing a path between unselected node 314 and selected node 323, a simple path of 2 is found running through node 315 or through node 321. The third path between node 314 and 323 is given a weight of ½, since a longer path is worth less than a smaller path. Thus, the TRR score for node 314 is 2½.

When drawing a path between unselected node 315 and selected node 312, a simple path of 1 is found since both attributes are a part of dataset 310. When drawing a path between unselected node 315 and selected node 313, a simple path of 1 is found since both attributes are a part of dataset 310. When drawing a path between unselected node 315 and selected node 323, a simple path of 1 is found since a relationship 302 exists between the two nodes. Thus, the TRR score for node 315 is 3.

When drawing a path between unselected node 316 and selected node 312, a simple path of 1 is found since both attributes are a part of dataset 310. When drawing a path between unselected node 316 and selected node 313, a simple path of 1 is found since both attributes are a part of dataset 310. When drawing a path between unselected node 316 and selected node 323, a simple path of 2 is found running through node 315 or through node 326. The third path between node 316 and 323 is given a weight of ½, since a longer path is worth less than a smaller path. Thus, the TRR score for node 316 is 2½.

When drawing a path between unselected node 321 and selected node 312, a simple path of 2 is found that runs through node 314. When drawing a path between unselected node 321 and selected node 313, a simple path of 2 is found that runs through node 314. When drawing a path between unselected node 321 and selected node 323, a simple path of 1 is found since both nodes are part of dataset 320. The first two paths are given a weight of ½ because a longer path is given less weight than a shorter path. Thus, the TRR score for node 321 is 2.

When drawing a path between unselected node 322 and selected node 312, a simple path of 3 is found that runs through nodes 321 and 314, or through nodes 323 and node 315. When drawing a path between unselected node 321 and selected node 313, a simple path of 3 is found that runs through nodes 321 and 314, or through nodes 323 and node 315. When drawing a path between unselected node 321 and selected node 323, a simple path of 1 is found since both nodes are part of dataset 320. The first two paths are given a weight of ⅓ because a longer path is given less weight than a shorter path. Thus, the TRR score for node 321 is 1⅔.

When drawing a path between unselected node 324 and selected node 312, a simple path of 3 is found that runs through nodes 321 and 314, or through nodes 323 and node 315. When drawing a path between unselected node 324 and selected node 313, a simple path of 3 is found that runs through nodes 321 and 314, or through nodes 323 and node 315. When drawing a path between unselected node 324 and selected node 323, a simple path of 1 is found since both nodes are part of dataset 320. The first two paths are given a weight of ⅓ because a longer path is given less weight than a shorter path. Thus, the TRR score for node 324 is 1⅔.

When drawing a path between unselected node 325 and selected node 312, a simple path of 3 is found that runs through nodes 321 and 314, or through nodes 323 and node 315. When drawing a path between unselected node 325 and selected node 313, a simple path of 3 is found that runs through nodes 321 and 314, or through nodes 323 and node 315. When drawing a path between unselected node 325 and selected node 323, a simple path of 1 is found since both nodes are part of dataset 320. The first two paths are given a weight of ⅓ because a longer path is given less weight than a shorter path. Thus, the TRR score for node 325 is 1⅔.

When drawing a path between unselected node 318 and selected node 312, a simple path of 2 is found that runs through node 313. When drawing a path between unselected node 318 and selected node 313, a simple path of 1 is found since transformation 318 is applied to attribute 313. When drawing a path between unselected node 318 and selected node 323, a simple path of 3 is found running through nodes 313 and 315. The first path is given a weight of ½ while the third path is given a weight of ⅓. Thus the TRR score of node 318 is 1⅚.

When drawing a path between unselected node 319 and selected node 312, a simple path of 2 is found that runs through node 316. When drawing a path between unselected node 319 and selected node 313, a simple path of 2 is found that runs through node 316. When drawing a path between unselected node 319 and selected node 323, a simple path of 2 is found running through node 326. The first path is given a weight of ½, the second path is given a weight of ½, aid the third path is given a weight of ½. Thus the TRR score of node 319 is 1½.

When drawing a path between unselected node 326 and selected node 312, a simple path of 2 is found that runs through node 316. When drawing a path between unselected node 326 and selected node 313, a simple path of 2 is found that runs through node 316. When drawing a path between unselected node 326 and selected node 323, a simple path of 1 is found since transformation 326 is applied to attribute 323. The first path is given a weight of ½ and the second path is given a weight of ½. Thus the TRR score of node 326 is 2.

After the evaluation of each node is performed, the system could then rank each of the suggested attributes and the suggested transformations. The ranking determines the importance or probability that a given candidate node is of interest to the set of selected nodes of working graph 340. Here, a ranking of the suggested attributes 311, 314, 315, 316, 321, 322, 324, and 325 might be as follows: 315 (TRR 3), 311 (TRR 2½), 314 (TRR 2½), 316 (TRR 2½). 321 (TRR 2), 322 (TRR 1⅔), 324 (TRR 1⅔). 325 (TRR 1⅔). Likewise, a ranking of the suggested transformations 318, 319, and 326 would be as follows: 326 (TRR 2), 318 (TRR 1⅚), 319 (TRR 1½)

The resulting ranked lists of suggested attributes and transformations could then be provided to users via a user interface, or to systems via a calling system. The attributes and/or transformations could also be segmented by type in order to form a sub-list of actions or recommendations to take based on the user's or the calling system's needs. As the remote entity traverses through universe graph 300, selects attributes, and/or selects transformations, the system could record the entity's actions and alter the weights of relationships accordingly.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for generating a new dataset from disparate data sources, comprising:
   a computer readable memory;
   a data collection module that stores, on the memory, a universe graph comprising a plurality of datasets, wherein each dataset comprises a set of attributes, and that stores, on the memory, an aggregated set of attributes from the plurality of datasets and an aggregated set of transformations having relationship paths to at least some of the aggregated set of attributes;
   a interface module that provides a list of the aggregated set of attributes and the aggregated set of transformations to a distal computing device and receives a first selection of attributes for the new dataset from the distal computing device; and
   a relevance ranking module programmed to:
   (a) generate a working graph comprising datasets having the first selection of attributes for the new dataset, wherein the datasets comprise a subset of the aggregated set of attributes,
   (b) generate relationship paths between at least two of the aggregated set of transformations in the universe graph,
   (c) traverse relationship paths between the first selection of attributes for the new dataset and the subset of the aggregated set of attributes, including the generated relationship paths, to generate attribute traversal relevance rankings between unselected attributes of the subset of the aggregated set of attributes and the first selection of attributes, and (d) save the working graph, including the attribute traversal relevance rankings, to the data collection module as a new dataset, (e) rank the unselected attributes of the subset of the aggregated set of attributes as a first ranked list of suggested attributes from the aggregated set of attributes as a function of the traversal relevance rankings, wherein the interface module is further configured to provide the working graph and the first ranked list of suggested attributes to the distal computing device.

2. The system of claim 1, wherein the suggested attributes are ranked based at least in part on an attribute traversal relevance ranking between each of the suggested attributes and at least a portion of the first selection of attributes.

3. The system of claim 1, wherein the attribute traversal relevance rankings are derived as a function of a numerical distance of a relationship path on a nodal map.

4. The system of claim 1, wherein the attribute traversal relevance rankings are derived as a function of a number of relationship paths between at least two of the aggregated set of attributes.

5. The system of claim 1, wherein the relevance ranking module is further programmed to:
(a) traverse relationship paths between the aggregated set of transformations to generate a list of transformation traversal relevance rankings between any two of the aggregated set of transformations; and
(b) generate a second ranked list of suggested transformations from the aggregated set of transformations as a function of the transformation traversal relevance rankings.

6. The system of claim 5, wherein the suggested transformations are ranked based at least in part on a transformation traversal relevance ranking between each of the suggested transformations and at least a portion of the first selection of attributes.

7. The system of claim 6, wherein the transformation traversal relevance rankings are derived as a function of a numerical distance of the relationship path on a nodal map.

8. The system of claim 5, wherein each of the suggested transformations is associated with at least one of the group consisting of the suggested attributes and the first selection of attributes.

9. The system of claim 5, wherein the interface module is further configured to present the second ranked list of suggested transformations to the distal computing device.

10. The system of claim 9, wherein the interface module is further configured to receive a second selection of at least some of the suggested transformations.

11. The system of claim 5, wherein the distal computing device comprises a user interface configured to:
receive the aggregated set of attributes from the interface module;
enable a user entity to select the first selection of attributes from the aggregated set of attributes;
transmit the first selection of attributes from the user interface to the interface module;
receive the ranked suggested attributes and transformations from the interface module; and
display the ranked suggested attributes and transformations to a display of the user interface.

12. The system of claim 5, wherein the distal computing system comprising a calling computer system configured to:
receive the aggregated set of attributes from the interface module;
automatically select the first selection of attributes and transformations and transmit the first selection to the interface module; and
receive the ranked suggested attributes and transformations from the interface module.

13. The system of claim 12, wherein the calling computer system is further configured to automatically select a second selection of attributes and transformations from the ranked suggested attributes and transformations as a function of a ranking of the ranked suggested attributes and transformations and transmit the second selection to the interface module, and wherein the system further comprises a dataset generation module that generates the new dataset as a function of the first selection and the second selection.

14. The system of claim 1, wherein the interface module receives a second selection of at least some of the suggested attributes.

15. The system of claim 14, further comprising a dataset generation module that generates the new dataset as a function of the first selection and the second selection.

16. The system of claim 1, wherein the interface module receives a second selection of at least some of the suggested attributes, and wherein the relevance ranking module generates a second ranked list of suggested attributes as a function of the second selection.

17. The system of claim 1, wherein the relevance ranking module is programmed to generate relationship paths between the at least two of the aggregated set of transformations as a function of common utilization metrics of the at least two of the aggregated set of transformations.

18. The system of claim 1, wherein the relevance ranking module is further programmed to generate relationship paths between at least two of the aggregated set of attributes.

19. The system of claim 1, wherein the relevance ranking module is further programmed to generate a working graph comprising the first ranked list of suggested attributes and wherein the interface module is further configured to provide the working graph to the distal computing device.

20. The system of claim 1, wherein the interface module is further programmed to receive a first selection of transformations for the new dataset from the distal computing device, and the relevance ranking module is programmed to generate traversal relevance rankings as a function of the first selection of transformations.

* * * * *